March 14, 1933.    G. L. BARNES ET AL    1,900,894
GROUND CONNECTER
Filed July 26, 1930
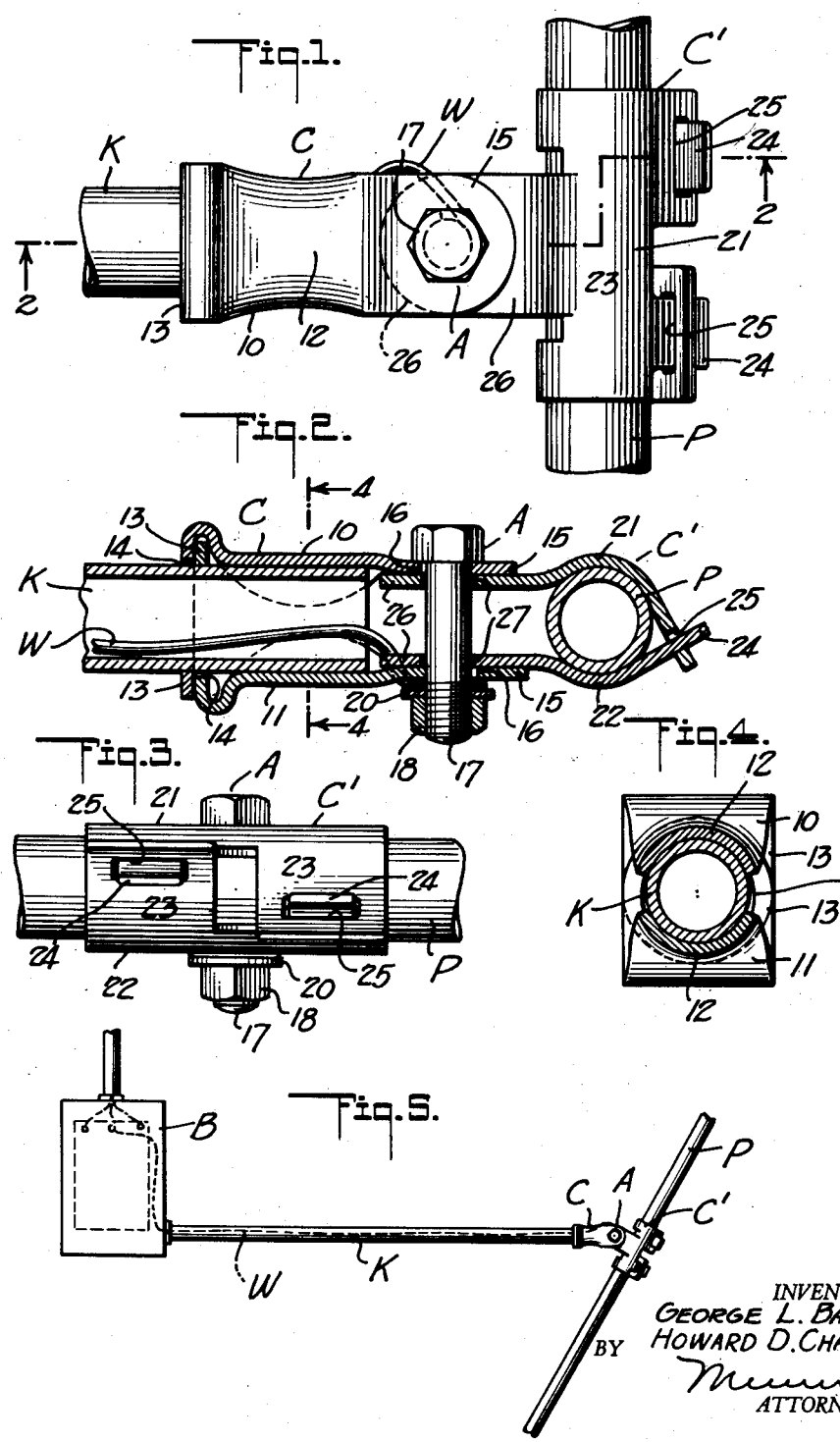
INVENTORS
GEORGE L. BARNES
HOWARD D. CHAPMAN
BY
ATTORNEYS.

Patented Mar. 14, 1933

1,900,894

UNITED STATES PATENT OFFICE

GEORGE L. BARNES AND HOWARD D. CHAPMAN, OF LOS ANGELES, CALIFORNIA; SAID CHAPMAN ASSIGNOR TO SAID BARNES

GROUND CONNECTER

Application filed July 26, 1930. Serial No. 470,972.

Our invention relates to and has for a purpose the provision of a connecter of simple, substantial and inexpensive construction, by which a metallic conduit leading from an electric switch box or outlet box, and a conductor in the conduit constituting the side of a line intended to be grounded, can with the utmost ease and dispatch, be connected to a water pipe for example, to form a positive and permanent ground connection of the conduit and conductor to the pipe as is required in underwriters regulations governing electrical installations, all in such manner that in the event the conductor should part as a result of a short circuit or other cause, the connecter will maintain the requisite ground connection of the conduit to the water pipe.

It is a further purpose of our invention to provide a connection which is adjustable in a manner to connect the conduit and water pipe, irrespective of the dispositions of the two relative to each other, thereby enabling the connecter to be used with various arrangements of piping.

We will describe only one form of ground connecter embodying our invention, and will then point out the novel features thereof in claims.

In the accompanying drawing:

Figure 1 is a view showing in plan, one form of ground connecter applied to a conduit and a water pipe when disposed in substantially right angular relation.

Figure 2 is a vertical sectional view taken on the line 2—2 of Figure 1 and looking in the direction of the arrows.

Figure 3 is a view in elevation looking from one end of the connecter.

Figure 4 is a transverse sectional view taken on the line 4—4 of Figure 2 and looking in the direction of the arrows.

Figure 5 is a semi-diagrammatic view illustrating the manner in which the connecter is employed in an electrical installation.

Referring specifically to the drawing in which similar reference characters designate similar parts in each of the several views, our invention in its present embodiment comprises two clamps designated generally at C and C' and a connecting and actuating means for the clamps, designated generally at A.

The clamp C comprises a pair of jaws 10 and 11, of identical construction and preferably formed from sheet metal of suitable gage. The jaws 10 and 11 are each constructed to provide a transversely curved body 12 one end of which is bent to form a lateral extension 13 having an opening 14 of sufficient diameter to freely receive a metallic conduit K leading from a switch box or outlet box B and containing a conductor or wire W intended for the grounding of one side of the line to a water pipe P as is customary in electrical installations. The opposite end of the body 12 of each jaw 10 and 11 terminates in a longitudinal extension or ear 15 provided with an opening 16 through which a bolt 17 having a nut 18 and a washer 20 thereon is adapted to be extended.

The clamp C' comprises a pair of jaws 21 and 22, also of identical construction and preferably formed of sheet metal of suitable gage. The jaws 21 and 22 are each constructed to provide a transversely curved body 23 one side edge of which is provided with a tongue 24 and an opening in the form of a slot 25, the slot of the jaw 21 receiving the tongue of the jaw 22 when the jaws are reversely disposed as shown in the drawing so as to prevent lateral separation as well as relative longitudinal displacement of the jaws. The other side edge of each of the jaws 21 and 22 is provided with an extension or ear 26 having an opening 27 through which the bolt 17 is also adapted to be extended.

The operation of the connecter is as follows:

The conduit K leading from the box B is cut off adjacent the water pipe P and the jaws 10 and 11 of the clamp C applied to the free end of the conduit as shown in Figure 2 so that the jaws are reversed with respect to each other and the conduit is received between the jaws and extends through the registering openings 14 of the oppositely extending lateral extension 13 of the jaws.

The jaws 21 and 22 of the clamp C' are applied to the pipe P so that the tongue 24 of each jaw extends through the slot 25 of the other jaw, after which the openings 16 and 27 of the extensions 15 and 26 respectively, are brought into registration and the bolt 17 then extended through the openings. The washer 20 and nut 18 are now applied to the bolt.

The bared end of the conductor W which is of sufficient length to extend from the conduit K, is then curled around the bolt 17 either under its head or under the washer 20, after which the nut 18 is tightened. As the lateral extensions 13 of the jaws 10 and 11, and the coacting tongues 24 and openings 25 of the jaws 21 and 22, prevent lateral displacement of the jaws outwardly from the conduit and pipe respectively, it will be clear that upon tightening the nut 17, the bolt will coact with the nut to force the jaws of each pair towards each other and thereby cause the jaws 10 and 11 to clampingly engage the conduit K, and the jaws 21 and 22 to clampingly engage the pipe P, thus fixedly securing the connecter to the pipe and conduit. Upon tightening the nut, the free end portions of the lateral extensions 13 bearing against the conduit K, tend to bite into the latter as the stresses imposed on these extensions are in opposed directions, thereby further insuring the secure connection of the clamp C to the conduit.

As the bolt 17 provides a pivotal connection between the clamps C and C', the clamps can be angularly adjusted relatively in accordance with the angular relationship between the conduit K and pipe P, which may vary widely in different installations, thus rendering the connecter universal in its use.

Should the conductor W part for any reason such as a short circuit for example, the ground connection to the water pipe P will of course be positively maintained by our connecter through the medium of the metallic conduit K which is secured to the grounded box B in the usual manner followed in the art. The large surface areas of the clamp jaws in contact with the conduit and pipe reduce to a minimum, heating of the connecter as a result of an overloaded or short circuit, so that fusing and burning away of the connecter will be prevented.

Although we have herein shown and described only one form of ground connecter embodyng our invention, it is to be understood that various changes and modifications may be made therein without departing from the spirit of the invention and the spirit and scope of the appended claims.

We claim:

1. A ground connecter comprising two clamps each having a pair of jaws coacting to receive a pipe or conduit therebetween, coacting means on the jaws of each clamp for preventing separation of the respective jaws laterally from the respective pipe or conduit, extensions on the jaws of each clamp, a bolt passing through the extensions, and a nut on the bolt coacting therewith and with said coacting means to cause the jaws to clampingly embrace the respective pipe or conduit.

2. A ground connecter comprising two clamps each having a pair of jaws coacting to receive a pipe or conduit therebetween; lateral and oppositely projecting extensions on the jaws of one clamp, having registering openings through which the respective pipe or conduit is extended between the jaws, one jaw of the other clamp having an opening and the other jaw a tongue extending into the opening, other extensions on the jaws of each clamp, a bolt passing through said other extensions, and a nut on the bolt coacting therewith to cause the jaws to clampingly engage the respective pipe or conduit.

3. A ground connecter comprising: a pair of two-part clamps; the parts of each clamp having co-acting jaws for receiving a pipe therebetween; extensions on the parts of each clamp having openings; a bolt passing through the openings to pivotally connect the parts of one clamp to the parts of the other clamp; and a nut on the bolt adapted to co-act therewith in clamping the jaws of each clamp about a pipe.

GEORGE L. BARNES.
HOWARD D. CHAPMAN.